(12) United States Patent  
Sarpy

(10) Patent No.: US 7,316,372 B2
(45) Date of Patent: Jan. 8, 2008

(54) FUSELAGE SPAR FOR AIRCRAFT AND CENTRAL SPARBOX PROVIDED WITH SUCH A SPAR

(75) Inventor: Bruno Sarpy, Fenouillet (FR)

(73) Assignee: Airbus France, Toulouse (FR)

( * ) Notice: Subject to any disclaimer, the term of this patent is extended or adjusted under 35 U.S.C. 154(b) by 239 days.

(21) Appl. No.: 11/070,648

(22) Filed: Mar. 2, 2005

(65) Prior Publication Data

US 2005/0230538 A1     Oct. 20, 2005

(30) Foreign Application Priority Data

Mar. 4, 2004   (FR) ................................. 04 50452

(51) Int. Cl.
    *B64C 1/00*   (2006.01)
(52) U.S. Cl. ................ 244/119; 244/123.1; 244/123.8; 244/131
(58) Field of Classification Search ................ 244/119, 244/120, 123.1, 123.14, 123.7, 123.8, 125, 244/131, 123.9
    See application file for complete search history.

(56) References Cited

U.S. PATENT DOCUMENTS

| | | | |
|---|---|---|---|
| 1,814,556 A | * | 7/1931 | Jewett, Jr. ................. 244/119 |
| 2,081,490 A | * | 5/1937 | Marski ........................ 244/55 |
| 2,347,542 A | | 4/1944 | Cyron et al. |
| 2,430,643 A | * | 11/1947 | Marhoefer ............... 244/123.7 |
| 4,198,018 A | * | 4/1980 | Brault ........................ 244/119 |
| 5,171,510 A | * | 12/1992 | Barquet et al. ............. 264/258 |
| 5,496,001 A | | 3/1996 | Skow |
| 5,806,797 A | * | 9/1998 | Micale ...................... 244/120 |
| 5,954,111 A | * | 9/1999 | Ochoa ....................... 160/201 |
| 6,250,361 B1 | * | 6/2001 | Ochoa ....................... 160/201 |
| 6,474,600 B1 | * | 11/2002 | Apps ....................... 244/137.1 |

FOREIGN PATENT DOCUMENTS

| | | | |
|---|---|---|---|
| FR | 1 004 041 | | 3/1952 |
| GB | 2196923 A | * | 5/1988 |
| GB | 2 268 461 A | | 1/1994 |
| GB | 2 320 002 A | | 6/1998 |

* cited by examiner

*Primary Examiner*—J. Woodrow Eldred
(74) *Attorney, Agent, or Firm*—Patterson, Thuente, Skaar & Christensen, P.A.

(57) ABSTRACT

A fuselage spar for aircraft is vertically mounted between an upper surface panel and a lower surface panel of the fuselage at the junction between a first wing structure spar and a second wing structure spar symmetrical with the first wing structure spar relative to the fuselage, and comprises peripheral zones and a central zone. This fuselage spar comprises a hollowed-out portion in the central zone, the peripheral zones of the spar providing for a draining of the normal loads conveyed by the wing structure spars. Also disclosed is a central spar box comprising such a spar.

14 Claims, 2 Drawing Sheets

FUSELAGE SPAR FOR AIRCRAFT AND CENTRAL SPARBOX PROVIDED WITH SUCH A SPAR

RELATED APPLICATION

The present application claims priority to French Application No. 04 50452 filed Mar. 4, 2004.

FIELD OF THE INVENTION

The invention relates to a fuselage spar for aircraft, provided with a central recess or hollowed portion. This central hollowed portion reduces the quantity of material needed to manufacture the spar and, hence, its mass, without modifying the main functions of the spar such as the draining of the loads coming from the wing structure.

The invention can be applied in aeronautics and, especially, in the making of the central wing spar box or central spar box of an aircraft.

DESCRIPTION OF THE PRIOR ART

An aircraft, and especially an airplane, has a body, also called a fuselage, and wings forming the wing structure of the aircraft. This wing structure is mounted on the fuselage and fixed by means of a central wing spar box whose main function is to set up a junction between the two opposite wings of the aircraft. Each of these wings has a wing spar box fitted out with at least two spars. In this document, the term "fuselage spar" shall designate the spar of the central wing spar box located in the fuselage of the aircraft. The central wing spar box repeats the architecture of the wing spar boxes and extends this architecture to the interior of the fuselage while setting up all the structural junctions with the fuselage. The connection of the elements constituting the various parts of the central wing spar box and of the wing spar boxes as well as the connection of the spar boxes to one another is generally done by fishplating, namely by using joining parts that are bolted or riveted to said elements. The central wing spar box is generally assembled with a wing spar box by placing a bracket joint on top of a structural element of the central spar box and the corresponding structural element of the wing spar box and by holding these elements from beneath, using a counter-bracket joint. The central spar box element is thus joined to the corresponding wing spar box element by fishplating at the junction between the fuselage and the wing structure. The central wing spar box generally has an extrados or upper surface panel and an intrados surface or lower surface panel, parallel to each other. The upper surface and lower surface panels have the role of absorbing or taking up the lifting forces of the aircraft. More specifically, the upper surface panel takes up mainly the compression loads exerted on the wing structure and conveyed to the fuselage by said wing structure; the lower surface panel takes up chiefly the thrust loads conveyed by the wing structure to the fuselage. The upper surface and lower surface panels of the fuselage are held by means of at least two spars, a front spar and a rear spar. These spars of the central wing spar box are also used to absorb a part of the normal forces conveyed by the wing spar box.

In certain types of aircraft, especially those where root of the wing spar boxes is large, these wing spar boxes have an additional spar at the center of the structure. This additional spar is called a central spar. Its role then is to absorb the normal loads and homogenize the torsion shear stresses. In this case, the wing spar box must also comprise a central spar to provide for the continuity of the membrane loads (normal loads) carried by the central spars of the wing structure.

The central spar of the wing structure may be a rod lattice type of spar. This case, the central spar of the fuselage will also be of a rod lattice type. A rod lattice spar of this kind has a plurality of bars that may be vertical or form a non-zero angle with the horizontal, the bars being assembled so as to maintain the upper surface and lower surface panels in a rigid structure. In other words, a rod lattice type of spar, along with the front and rear spars, provides for the rigidity of the central wing spar box, especially under the action of the normal forces due to pressure.

The central wing spar may be solid. In this case, the central spar of the fuselage must also be solid. This spar is called a plate-web spar. This spar is assembled with the upper surface and lower surface panels so as to provide a certain rigidity to the entire central wing spar box, especially under the action of the normal loads due to pressure.

In the case of a large-rooted wing spar box, the central wing spar must often be solid, to absorb the loads with greater efficiency. The central spar of the fuselage is therefore usually a plate-web spar. Now, in aeronautics, it is constantly being sought to save mass. Hence, aircraft manufacturers seek to reduce the quantity of material at every possible position. It is to meet this constant search for savings in mass that rod lattice spars had been made and installed in certain aircraft. However, such spars may be positioned in the spar box located in the fuselage only if the wing structure spars that correspond to it are not solid. If not, namely if the wing structure spars are plate-web spars, then a rod lattice type of fuselage spar cannot absorb all the loads conveyed by the wing spars, because this would have too great an effect on the surrounding structure. There would then be heavy risks of disturbance.

This is why, it is common practice to place a plate-web spar in the central wing spar box at the junction with the plate-web wing spars. Furthermore, to comply with this problem of saving mass, manufacturers have sought to reduce the thickness of the central fuselage spar. However, when the thickness of this fuselage spar is too small, the spar buckles. There is therefore a lower limit to the thickness of this spar.

DESCRIPTION OF THE INVENTION

It is precisely a goal of the invention to overcome the drawbacks of the techniques described here above. To this end, the invention proposes a fuselage spar comprising a central recess or hollowed-out portion.

The invention therefore proposes to hollow out the central zone of the fuselage spar in order to reduce the total mass of the spar, without any consequences for the absorption by said spar of the normal load coming from the wing structure spar, since this normal load is absorbed by the peripheral zones of the spar.

More specifically, the invention relates to a fuselage spar for aircraft, vertically mounted between an upper surface panel and a lower surface panel of the fuselage at the junction of a first wing structure spar with a second wing structure spar symmetrical with the first wing structure spar relative to the fuselage, comprising peripheral zones and a central zone. This spar is characterized by the fact that it comprises a hollowed-out portion in the central zone, the peripheral zones of the spar providing for a draining of the normal loads conveyed by the wing structure spars.

The spar of the invention may comprise one of the following characteristics:
- the central hollowed-out portion has a substantially oval shape,
- the upper and lower peripheral zones are thinned at their center,
- the upper and lower peripheral zones are interrupted at their center,
- the lateral peripheral zones are thinned at their center,
- the peripheral zones have a constant thickness or a variable thickness, decreasing from the ends of each zone toward the center of each zone,
- the spar has two elements placed vertically to each other,
- each of the two elements of the spar comprises a shoulder fixed to one of the lower surface or upper surface panels,
- each element is fixed to one of the upper surface or lower surface panels by means of a corner angle,
- the two elements of the spar are joined to each other by means of a bracket joint,
- the two elements of the spar are made out of different materials.

The invention also relates to a central wing spar box situated in the fuselage, comprising such a spar.

DETAILED DESCRIPTION OF EMBODIMENTS OF THE INVENTION

Figure 1:
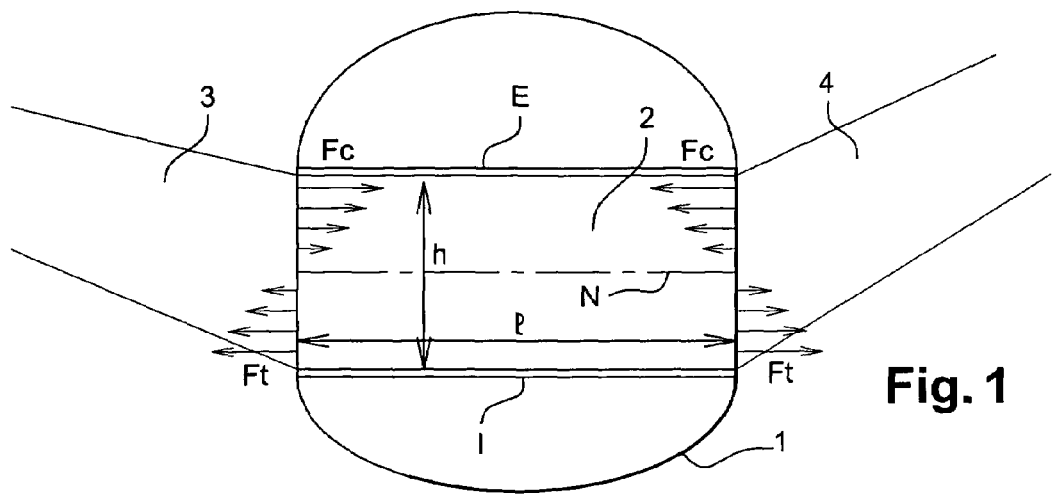
FIG. 1 is a schematic view in section of a central wing spar box with the normal loads absorbed by the spars of this wing spar box.

FIG. 1 shows a schematic view in section of a central spar box in an aircraft fuselage. This section shows a spar 2 of the central wing spar box 1 of the aircraft. As can be seen in FIG. 1, this spar 2 is inscribed within the circumference of the fuselage. It is placed between a first wing spar 3 and a second wing spar 4, symmetrical with the first spar 3 relative to the fuselage. In other words, the spar 2 of the central spar box, hereinafter called the fuselage spar, as opposed to the wing structure spars or wing spars, is mounted at the junction of the first wing spar 3 and the second wing spar 4. These two wing structure spars are plate-web spars.

The fuselage spar 2 is mounted vertically between an upper surface panel E and a lower surface panel I of a wing spar box.

The fuselage spar 2 is substantially rectangular, with a height h that is the same as the height of the wing spar 3 or 4 and corresponds to the space between the upper surface panel E and the lower surface panel I. This fuselage spar 2 has a length l corresponding approximately to the diameter of the fuselage.

FIG. 1 shows that each wing spar 3 and 4 conveys normal loads to the junction of the fuselage spar 2. These normal loads are of two types: compression loads Fc which are essentially absorbed by the upper surface panel E and thrust loads Ft which are essentially absorbed by the lower surface panel I. Indeed, the greatest loads are absorbed by the lower surface and upper surface panels. A part of the loads is also absorbed by the fuselage spar 2, as can be seen in FIG. 1. These compression and thrust forces decrease from the end of the spar, that is from the sides of the spar located in the vicinity of the panel I and E, toward the median line of the height of the spar 2. This median line of the height of the spar 2 forms a neutral line N. In other words, on this line N, there is almost no normal load, for the force applied homogenizes the bending load on the spar box.

In most cases, the neutral line N is located at mid-height on the spar. Throughout the description of the invention, the neutral line shall be considered to be at mid-height on the spar. However, in certain cases, this neutral line may be shifted toward the upper surface panel or the lower surface panel.

Figure 2:
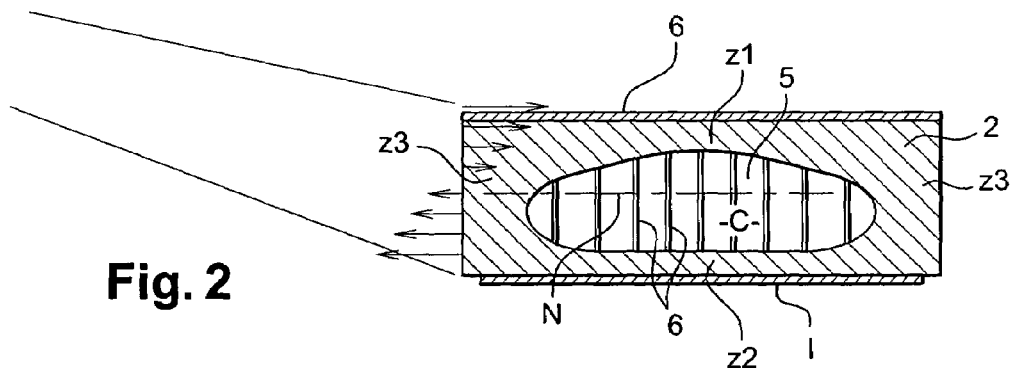
FIG. 2 is a schematic view in section of a spar of a central wing spar box, in the example of stabilized flight of the aircraft, according to the invention.

FIG. 2 shows a fuselage spar according to the invention. This fuselage spar, made out of single piece, has a central zone c located at the center of the surface of the spar and the peripheral zones. The peripheral zones are constituted by another zone z1, in the vicinity of the upper surface panel E, a lower zone z2 in the vicinity of the lower surface panel I, and two side zones z3 in the vicinity of the wing structure spars.

According to the invention, the central zone c is hollowed out. As shall be seen here below, this recess 5 made in the central zone c may have several shapes. In the example of FIG. 2, the recess 5 is oblong. This shape may be adapted to requirements, for example in the case of a need for rigidity along a vertical axis to counter cabin pressure, etc.

The hollowed-out central zone c is surrounded by two lateral zones z3, the upper zones z1 and the lower zone z2. As can be seen in FIG. 2, the normal loads conveyed by the wing structure spars 3 and 4 are taken up by the lateral zones z3 of the spar. It is therefore the lateral zones that provide for the draining of the thrust and compression loads.

The hollowed-out portion 5 lightens the mass of the fuselage spar 2, without modifying the absorption of the normal loads as compared with a plate-web spar. Indeed, in the invention, the membrane loads are carried toward the skin, that is, the thrust loads are carried to the lower surface panel I and the compression loads to the upper surface panel E.

As can be seen in FIG. 2, this spar of the invention is held up by vertical struts 6, called vertical stiffeners. These vertical stiffeners 6 hold the spar in a vertical position. The stiffeners 6 have the same role and the same fastening for a spar with a central hollowed-out portion 5 according to the invention as in the case of a classic plate-web spar.

According to one embodiment of the invention, all the peripheral zones of the spar have an identical thickness. In other words, the spar has a constant thickness throughout its non-hollowed surface. This thickness may be chosen to be greater than the minimum thickness of a classic plate-web spar, thus averting problems of stability. Indeed, since the material forming the spar is closer to that of the lower surface and upper surface panels, this material is more efficient than in the case of a classic plate-web spar. The spar works at a higher stress level, thus making it possible to reduce the work on the surrounding elements and therefore lighten the mass of these surrounding elements. In particular, these surrounding elements may be the upper surface panel and the lower surface panel. In this case, it is deliberately chosen to limit the saving in mass of the spar in order to save mass on the surrounding elements.

Figures 3A, 3B:
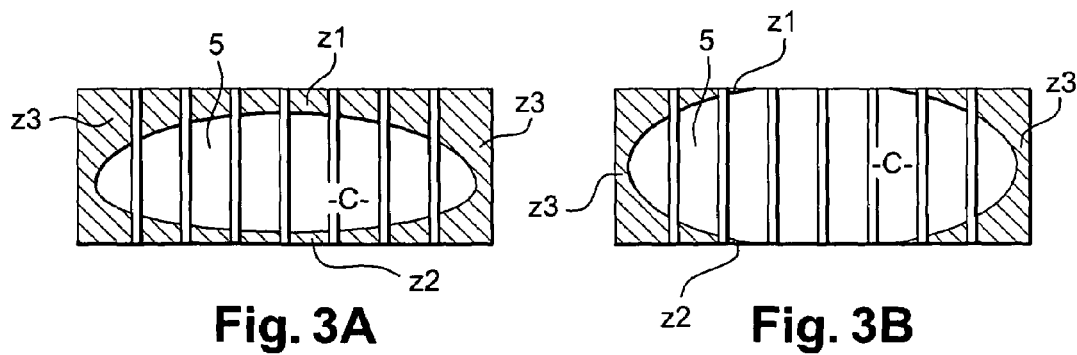
FIGS. 3A and 3B shows different shapes of a central hollowed-out portion on a spar according to the invention.

According to another embodiment, the thickness of the spar is not constant throughout the non-hollowed surface of the spar. For example, the thickness of the spar may be smaller in the parts close to the neutral line N since these are the parts of the spar least subjected to loads, and greater in the parts close to the upper surface and lower surface panels, which are the parts most subjected to normal loads. Such a variation in the thickness of the spar provides for a better distribution of the loads, with a concentration of material in the parts most subjected to these loads. For a spar sized for stability, the fact of concentrating the material on the uppers parts gives a solution entailing greater thickness locally, hence a solution giving better performance in terms of stability for a same fineness ratio (since the buckling is proportional to the cube of the thickness). Furthermore, the fact that the material is gradually brought to the greatest distance from the neutral line gives it greater efficiency relative to the bending moment of the wing structure. The mean level of work of the material is thus greater than that of a classic spar, thus offering greater efficiency of the material used FIGS. 3A and 3B, show two exemplary shapes of central hollowed-out portions that can be made on a spar according to the invention. In the example of FIG. 3A, the hollowed-out portion 5 is oval. The upper peripheral zone z1 and lower peripheral zone z2 are approximately identical and the lateral zones z3 are also identical. Each of the zones z1 and z2 is thinned at its center, i.e. the parts situated at midpoint along the length of the spar are less wide than the parts situated at the end of this length. Similarly, the lateral zones z3 are thinned at their center, i.e. the part situated at the mid-height on the spar is less wide than the parts situated at the ends of this height.

In the example of FIG. 3B, the hollowed-out portion 5 is also oval, with a heightwise section greater than that of FIG. 3A. In this example, the lateral zones z3 are approximately identical and so are the zones z1 and z2. However, in this example, the zones z1 and z2 are interrupted at their center. In other words, the zones z1 and z2 are interrupted in the part located at mid-length on the spar. In this example, the hollowed portion c is such that it partially eliminates the upper zone z1 and lower zone z2. The central heightwise section of the hollowed-out portion is also equal to the height of the spar. It will easily be understood that such a shape lightens the mass of the spar to the maximum extent, without any consequence for the absorption of the loads at the junction with the wing structure, while at the same time redistributing the loads toward the surrounding structures.

Figure 4A:
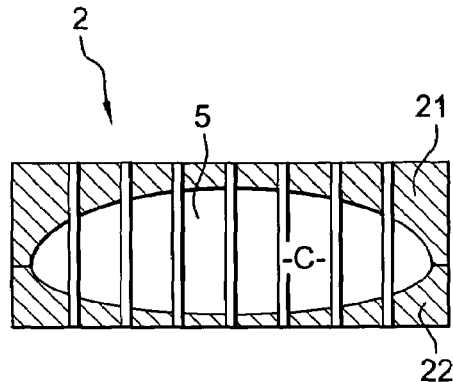
FIGS. 4A and 4B show two embodiments of a spar according to the invention made in two parts.
Figure 4B:
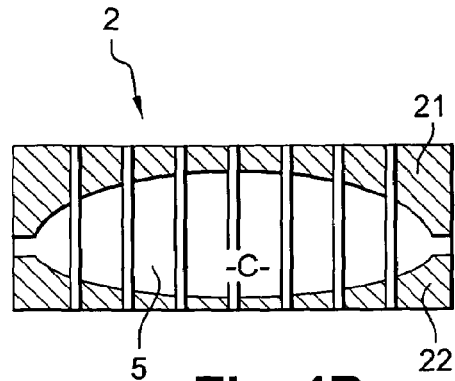

FIGS. 4A and 4B show two examples of the spar of the invention when it is made out of two elements.

Figure 5:
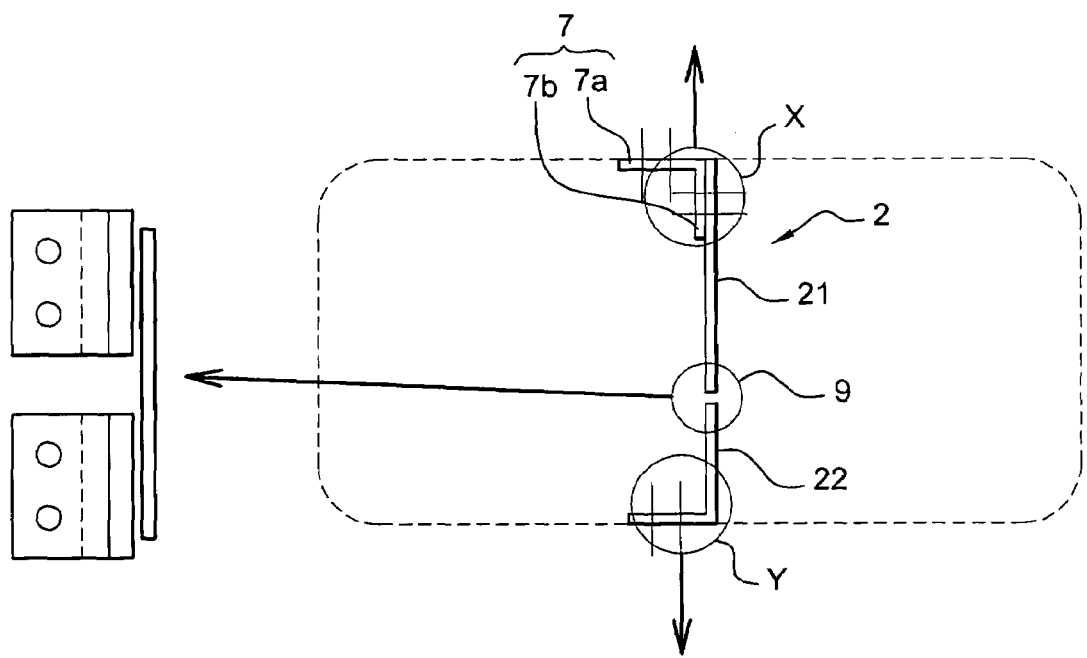
FIG. 5 shows two means of fastening the spar according to the invention to the upper surface and lower surface panels of the aircraft.

The spar of the invention as described here above is fixed, like most fuselage spars, to the upper surface and lower surface panels of the central spar box by means of corner angles. An example of such a corner angle is shown in the zone X of FIG. 5. A corner angle 7 is an L-shaped piece, made out of composite material or metal. A side 7a of the corner angle is fixed to one of the panels, namely the upper surface panel or the lower surface panel, and another side 7b of the corner angles is fixed to the spar. The corner angle is fastened by bolting.

In the embodiments of FIGS. 4A and 4B, each element of the spar may form a corner angle. In other words, the spar is made of two elements along the neutral line. In the example of FIG. 4A, the spar 2 has two elements 21 and 22. The element 21 is fixed to the upper surface panel. The element 22 is fixed to the lower surface panel. Each of these elements 21 and 22 corresponds to half of the spar shown in FIG. 2 and sectioned along the neutral line. These two elements may be connected by a joining bracket joint 9 shown in FIG. 5. Each element 21 and 22 forming the spar 2 may be fixed independently and directly to one of the lower surface or upper surface panels. In this case, each of the two elements has a shoulder placed at right angles to the classic spar panel. This shoulder is fixed to the lower surface panel or the upper surface panel, for example by direct bolting to the panels considered, as shown in the zone Y of FIG. 5.

In the example of FIG. 4A, the parts 21 and 22 have substantially the same height. It must be noted, however, that this height may be different, especially if the neutral line is not situated at the middle of the height of the spar.

In one particularly valuable embodiment of the invention, the element 21 and the element 22 of the spar 2 may be made out of different materials.

In particular, it is known that it is worthwhile to use a material that performs well under thrust/fatigue loads on the lower surface and a material that performs well under compression/static loads on the upper surface side. For example, it is worthwhile to use a metallic material such as an aluminum alloy for the upper surface panel and a carbon alloy for the lower surface panel. Hitherto, since the spar has been made in only one piece, it has been very difficult to make an upper surface panel and a lower surface panel out of two different materials since these two panels are connected by a same element, forming the spar, working on both the upper surface and lower surface sides. This spar must then be made out of a material compatible with the two materials of the lower surface and upper surface panels. This proves to be very difficult.

The embodiment of the invention that has just been described is particularly suited to the making of an upper surface panel and a lower surface panel out of different materials. Indeed, since the element 21 and the element 22 of the spar 2 are independent, they may made out of different materials. The element 21 is made out of a material that is compatible, for example, with aluminum and the element 22 is made out a material compatible, for example, with carbon. Since the junction between the two elements 21 and 22 is situated on the neutral line, there is no incompatibility between the two elements. Indeed, since the junction between the two types of materials occurs at a place where the strains and stresses are low, there is no problem related to the fishplating of the two very different materials. An element made of aluminum can therefore be fishplated with an element made of carbon.

Such a spar with a central hollowed-out portion, comprising only one element or two elements, brings the advantage of furthering movement inside the central spar box. It enables the easy passage of objects and maintenance persons from the front to the rear of the fuselage. This gives rise to a gain in productivity in the maintenance phases and also during the assembly of the aircraft.

Naturally, the spar of the invention has been described in the case where it is a central spar of the central wing spar box. However, this form of a spar with a hollowed-out portion can be used for any other fuselage spar.

The invention claimed is:

1. A fuselage spar for aircraft vertically mounted between an upper surface panel and a lower surface panel of the fuselage interposed between a first wing structure spar and a second wing structure spar symmetrical with the first wing structure spar relative to the fuselage, the fuselage spar comprising:

peripheral zones of the fuselage spar located proximate the upper surface panel, lower surface panel, or the first or second wing structure spars; and a central zone located proximate a center of the fuselage spar and central to the peripheral zones wherein the central zone defines an opening through the fuselage spar, and wherein the peripheral zones of the fuselage spar are adapted to absorb and redistribute the normal loads conveyed by the first and second wing structure spars.

2. A fuselage spar according to claim 1, wherein the central hollowed-out portion has a substantially oval shape.

3. A fuselage spar according to claim 1, in which the peripheral zones have a lateral zone in the vicinity of each wing structure spar, an upper zone in the vicinity of the upper surface panel and a lower zone in the vicinity of the lower surface panel, wherein the upper and lower peripheral zones are thinned at their center.

4. A fuselage spar according to claim 1, in which the peripheral zones have a lateral zone in the vicinity of each wing structure spar, an upper zone in the vicinity of the upper surface panel and a lower zone in the vicinity of the lower surface panel, wherein the upper and lower peripheral zones are interrupted at their center.

5. A fuselage spar according to claim 1, in which the peripheral zones have a lateral zone in the vicinity of each wing structure spar, an upper zone in the vicinity of the upper surface panel and a lower zone in the vicinity of the lower surface panel, wherein the lateral zones are thinned at their center.

6. A fuselage spar according to claim 1, wherein the peripheral zones have a constant thickness.

7. A fuselage spar according to claim 1, wherein the peripheral zones have a variable thickness, decreasing from the ends of each zone toward the center of each zone.

8. A fuselage spar according to claim 1, comprising two elements placed vertically to each other.

9. A fuselage spar according to claim 8, wherein each of the two elements of the fuselage spar comprises a shoulder fixed to one of either the upper surface panel or the lower surface panel.

10. A fuselage spar according to claim 8, wherein each element of the fuselage spar is fixed to one of either the upper surface panel or the lower surface panel by means of a corner angle.

11. A fuselage spar according to claim 8, wherein the two elements of the fuselage spar are joined to each other by means of a bracket joint.

12. A fuselage spar according to claim 8, wherein the two elements of the fuselage spar are made out of different materials.

13. A fuselage spar according to claim 1, placed at the center of a central wing spar box, between a front spar and a rear spar.

14. A central wing spar box located in an aircraft fuselage, comprising at least one fuselage spar according to claim 1.

* * * * *